July 26, 1960

C. V. HINTON 2,946,467

TEXTILE BOBBIN DELIVERY MEANS

Filed June 18, 1958

INVENTOR.
CHARLES V. HINTON
BY
Parrott & Richards
ATTORNEYS

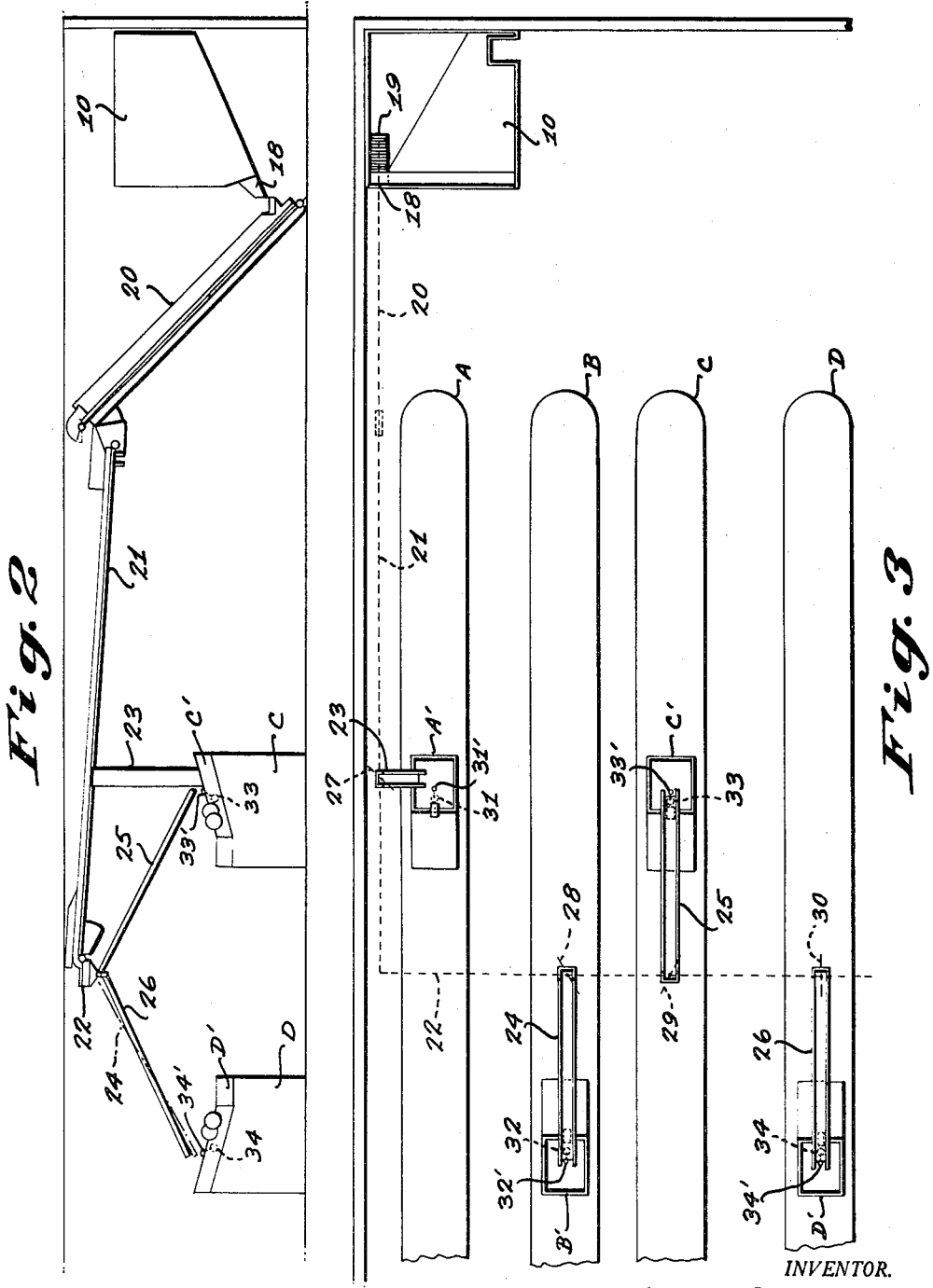

July 26, 1960

C. V. HINTON 2,946,467

TEXTILE BOBBIN DELIVERY MEANS

Filed June 18, 1958

INVENTOR.
CHARLES V. HINTON
BY
Parrott & Richards
ATTORNEYS

United States Patent Office 2,946,467
Patented July 26, 1960

2,946,467
TEXTILE BOBBIN DELIVERY MEANS

Charles V. Hinton, Charlotte, N.C., assignor to The Terrell Machine Company, a corporation of North Carolina
Filed June 18, 1958, Ser. No. 742,924
9 Claims. (Cl. 214—17)

This invention relates generally to the handling of articles during manufacturing operations, and more particularly to a uniquely efficient and advantageous arrangement of apparatus for maintaining at each of a plurality of operating stations a reserve supply of articles being handled thereat and to the manner in which such articles are supplied to the operating stations with apparatus arranged according to the present invention.

The apparatus and method of operation of the present invention is adapted for use to particular advantage in maintaining a group of automatic quill winding machines supplied with empty quills to have filling yarn packages wound thereon in preparation for textile weaving operations, and the invention is described in further detail below in relation to an embodiment arranged especially for this purpose. Generally characterized, however, the present invention contemplates the provision of a common main supply of the articles that are to be handled at the operating stations, the continuous sensing of the reserve supply of these articles at each of the operating stations, the signalling of any sensing of depletion of a reserve article supply at any of the operating stations, and the delivery of a replenishing supply of articles selectively from the common main supply in response to this signalling. The selective delivery of the replenishing article supplies is preferably made to respond to the signalling from the operating station in a given order so that concurrent signalling from more than one station is handled in that order without any difficulty or undue complication.

These and other features of the present invention are described in detail below in connection with the accompanying drawings, in which:

Fig. 2 is a further diagrammatic elevation illustrating the arrangement provided for delivering articles from the common main supply to any one of several operating stations;

Fig. 3 is a diagrammatic plan view corresponding generally to Fig. 2; and

Figure 1:
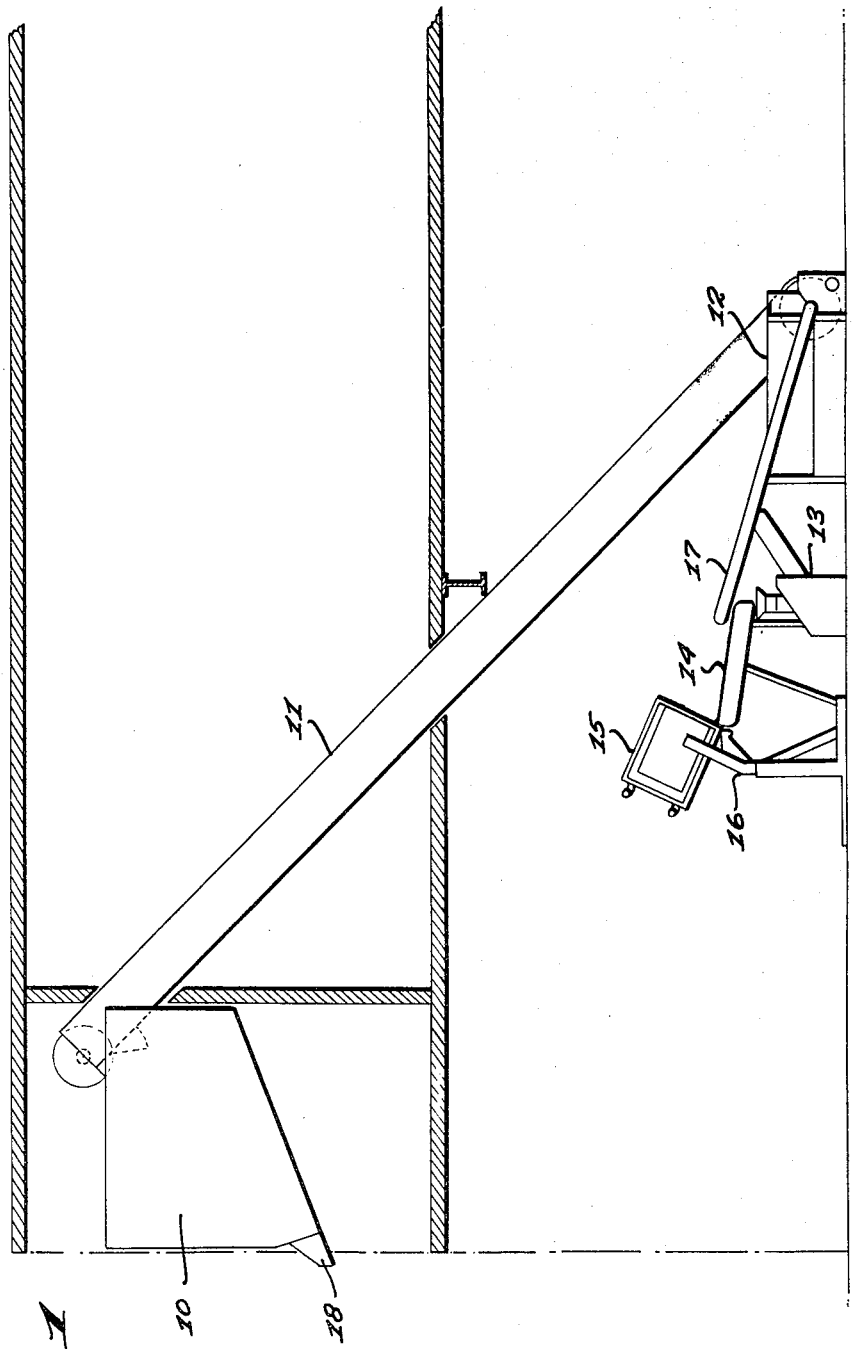
Fig. 1 is a diagrammatic elevation illustrating an arrangement of apparatus according to the present invention for providing a common main supply of articles to be handled at a plurality of operating stations.

Referring now in detail to the drawings, Fig. 1 illustrates diagrammatically a representative arrangement for providing a common main supply of empty quills, or other articles to be handled, at a supply bin 10. As shown in Fig. 1 the supply bin 10 is indicated as being arranged on an upper floor with a conveyor means 11 running thereto from quill or filling bobbin stripping apparatus 12 arranged on a lower floor, although the supply bin 10 and stripping apparatus 12 might be otherwise arranged, as a matter of choice, in any other convenient or desired relation.

The stripping apparatus 12 may suitably be of the general type disclosed in U.S. Patent No. 2,342,909, with a feeder hopper 13 provided thereat for receiving spent quills through a dump chute 14 from weave room collection carts 15 or the like emptied thereat by a lifting device 16 for delivery to the stripping apparatus 12. A return conveyor means 17 may also be provided in the usual manner for receiving incompletely stripped quills from the stripping apparatus 12 and returning them to the feeder hopper 13, while all completely stripped bobbins are transferred to the conveyor means 11 for transfer to the main supply bin 10, which might alternatively have empty quills delivered thereto in any manner suitable for maintaining an adequate common main supply thereof to meet the requirements of the operating stations to be served.

Figs. 2 and 3 show the arrangement of the main supply bin 10 in relation to the means provided according to the present invention for delivering the empty quills to a plurality of operating stations as needed to maintain a reserve supply thereof at each such station. For this purpose, the main supply bin 10 is provided with a discharge opening, as indicated at 18 in Fig. 2, at which a shaker mechanism indicated at 19 in Fig. 3, or other suitable discharge means, is provided for operation to deliver empty quills from the supply bin 10 to an inclined conveyor means 20 arranged to carry the empty bobbins discharged thereon upwardly to a conveyor means running to all of the operating stations that are to be supplied.

A plurality of operating stations are indicated in Fig. 3 at A, B, C, and D, and as previously mentioned these operating stations comprise quill winding machines according to the presently described embodiment of the invention, each of which machines normally incorporates a hopper as indicated at A', B', C' and D' for containing a reserve supply of empty quills thereat. In the illustrated embodiment, the conveyor means running to these operating stations comprises a first conveyor run as indicated at 21, and a second conveyor run 22 extending at right angles therefrom across the several operating stations, with suitable delivery chutes 23, 24, 25 and 26 arranged at each of the quill winding machine hoppers A', B', C' and D'; the respective conveyor runs 21 and 22 having settable deflecting gates or the like provided in relation thereto at each of the first three hopper chutes 23, 24 and 25, as indicated at 27, 28 and 29, while a fixed deflecting means 30, or other comparable arrangement, is provided for directing delivery discharge from the conveyor run 22 to the last hopper chute 26.

At each quilling machine hopper A', B', C' and D', a sensing means is provided for anticipating exhaustion of the reserve quill supply therein and signalling such anticipated exhaustion. This sensing means at each of the operating station hoppers suitably comprises a mechanical feeler element arranged, as indicated at 31, 32, 33 and 34, to gauge quantitatively the reserve quill supply in the hoppers A', B', C', and D', and respective electric switch means 31', 32', 33' and 34' controlled by these feeler elements for closing upon depletion of the reserve quill supply to a predetermined extent, so as thereupon to operate the above described empty quill delivery means for replenishing the depleted reserve supply.

Figure 4:
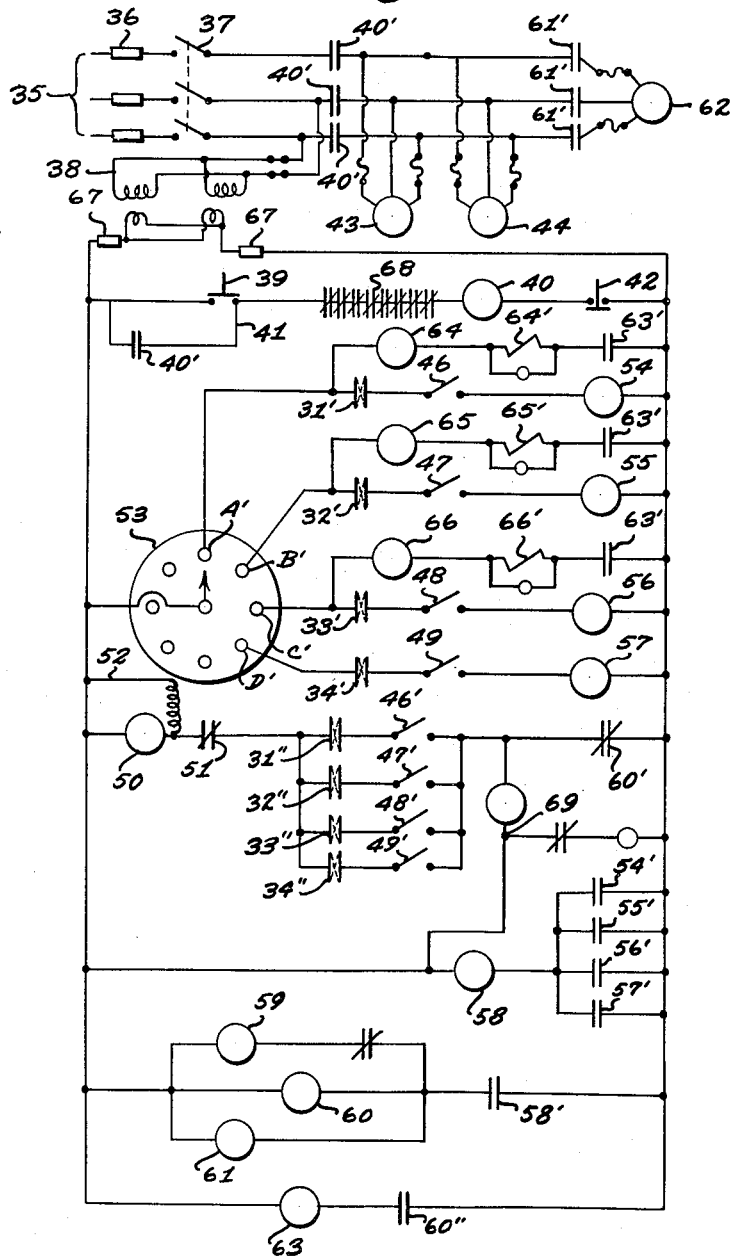
Fig. 4 is a schematic wiring diagram illustrating the arrangement of the article sensing and signalling means.

Fig. 4 shows schematically the arrangement of an electrical system for operating the quill delivery means so as to maintain the operating stations A, B, C, and D supplied in the manner indicated above. The Fig. 4 electrical system includes a three phase line circuit at 35, suitably 550 volts, with overload protection provided therein at 36 and a line switch at 37. From the line circuit 35 a single phase connection is arranged to transformer means at 38 from which a lower voltage, single phase, control circuit, suitably 110 volts, is provided. In a first parallel leg of this control circuit a manually operated, normally open, start switch 39 is connected in series with an actuating coil 40 controlling contacts 40' in the line circuit 35, and in a parallel holding circuit 41 bridging the start switch 39, so that momentary closing of the normally open start switch 39 results in energizing the actuating coil 40 to close all of the contacts 40', which will thereupon remain closed until a normally closed, manually operated, stop switch 42 also arranged in series with actuating coil 40 is opened. Closing of the contacts 40' in the line circuit 35 results in connecting operating motors at 43 and 44 provided for the conveyor means comprising the previously mentioned first and second conveyor runs 21 and 22, so that these conveyor runs will be maintained operating continuously for delivering empty quills transferred thereto from the supply bin 10.

The low voltage control circuit also includes additional parallel legs in which manually operated cut off switches are arranged as indicated at 46, 47, 48 and 49, for the purpose of allowing the control circuit to be disconnected with respect to any one of the operating stations A, B, C or D so as to allow continued operation of the remainder of the system whenever any one of the operating stations needs to be idle for repairs or any other reason. The cut off switches 46, 47, 48 and 49 are also connected in a further parallel leg of the control circuit as indicated at 46', 47', 48' and 49' to operate simultaneously thereat for the same purpose. The previously mentioned switch means 31', 32', 33' and 34', operated by the sensing means feeler elements 31, 32, 33 and 34, are connected in series with the manually operated cut off switches 46, 47, 48 and 49, and are further connected at 31'', 32'', 33'', and 34'' in series with the cut off switch connections at 46', 47', 48', and 49'. The switch means at 31', 32', 33' and 34' (and as also connected at 31'', 32'', 33'' and 34'') are preferably of the wobble type from which the respective feeler elements 31, 32, 33 and 34 are arranged to hang for sensing the reserve quill supply at each operating station hopper A', B', C' and D', a full reserve quill supply acting to displace the feeler element 31, 32, 33 or 34 thereat to an elevated position maintaining the related switch means open, while depletion of any of the reserve supplies to a predetermined extent allowing the feeler element thereat to assume a depending position closing the related switch means and thereby signalling the reserve supply depletion.

Assuming that all of the cut off switches are closed at 46, 47, 48 and 49, and at 46', 47', 48', and 49', closing of any of the sensing means switches results at 31'', 32'', 33'' or 34'' in energizing an actuating coil 50 which acts to open normally closed contacts 51 in the same circuit leg. Opening of the normally closed contacts 51 in turn results in deenergizing the actuating coil 50, which then results in allowing the contacts 51 to close again. As a bridging resistance leg 52 is arranged in relation to the actuating coil 50, this interaction with the contacts 51 results in causing a rotary, ratchet type, stepping relay 53 to index. The continued interaction of actuating coil 50 and contacts 51 accordingly causes the stepping relay to continue indexing until it closes on the parallel circuit leg corresponding to the sensing means contacts that have been closed at 31', 32', 33', or 34'. When this happens, an actuating coil 54, 55, 56 or 57 is energized in the particular circuit leg involved, which results in closing corresponding contacts in a parallel connected set at 54', 55', 56' and 57'. Closing of any one of these contacts 54', 55', 56' and 57' thereupon results in energizing a time delay relay coil 58 arranged in series therewith, which in turn acts immediately to close contacts at 58' in a further parallel control circuit leg so as to energize a solenoid valve coil 59, a time delay relay coil 60, and a further actuating coil 61, all three of which are parallelly connected in series with the contacts 58'.

Energizing of the actuating coil 61 closes contacts at 61' in the main line circuit 35 so as to start a motor at 62 which operates the previously mentioned inclined conveyor 20 arranged to receive the discharge from the main supply bin 10 and to transfer this discharge to the conveyor runs 21 and 22. The energized solenoid valve coil 59 is arranged to commence operation at the same time of the shaker mechanism 19 in the supply bin 10 for discharging quills therefrom to the inclined conveyor 20. The remaining time delay relay coil 60 also energized upon closing of the contacts 58' operates to open normally closed contacts at 60' and to close normally open contacts at 60''.

The normally open contacts 60'' are arranged in a further parallel control circuit leg in series with an actuating coil 63, which coil 63 is accordingly energized upon closing of contacts 60'' to act in turn on contacts 63' arranged in bridging circuits connected with the stepping relay contacts for the first three operating station hoppers A', B' and C'. These bridging connections also include actuating coils 64, 65 and 66 in series with the respective contacts 63' so that, upon closing of the contacts 63', when the stepping relay 53 is closed on an active contact thereof for any of the operating station hoppers A', B' or C' the corresponding actuating coil 64, 65 or 66 is energized to set the respective conveyor deflecting gate 27, 28 or 29 for directing the conveyor means discharge to the corresponding discharge chute 23, 24 or 25 at the selected operating station hopper A', B' or C'. If it is the last operating station hopper D' that is selected for reserve quill supply replenishment, no comparable setting is required, as the conveyor means can be allowed simply to discharge directly thereto from a fixed setting.

The normally closed contacts at 60', which are opened by the time delay relay coil 60 simultaneously with closing of the contacts 60'' thereby, are connected in series with the previously mentioned interacting actuating coil 50 and normally closed contacts 51 provided to operate the stepping relay 53. The opening of these normally closed contacts 60' by the time delay relay coil 60 serves the purpose of opening the actuating circuit to the stepping relay 53 and thereby preventing it from indexing further once it has closed on an active contact thereof for one of the operating station hoppers A', B', C' or D' at which the sensing switch 31', 32', 33', or 34' has been closed to signal a reserve quill supply depletion; all of the foregoing control circuit operations being safeguarded by suitable overload protection at 64', 65', 66', 67, 68 and 69.

At this stage, the quill delivery conveyor means will have been placed in operation by the control circuit for delivering a replenishing supply of empty quills to the operating station hopper A', B', C' or D' at which a depleted supply has been sensed. Upon delivery of the replenishing supply the feeler element 31, 32, 33 or 34 at the operating station being serviced will again be displaced to an elevated position so as to open the related sensing switch means at 31', 32', 33' or 34' (and also at 31'', 32'', 33'', or 34''), thereby deenergizing the related actuating coil 54, 55, 56 or 57 and thereupon opening the corresponding contacts at 54', 55', 56' or 57' to deenergize the time delay relay coil 58 connected in series therewith. This time delay relay coil 58 is set for a slight delay (of the order of a second or so) in opening the related contacts 58'. After this delay, which is provided to make certain that a consistent signal of reserve quill supply replenishment is being received from the involved sensing means switch 31', 32', 33' or 34', the opening of contacts 58' deenergizes the solenoid valve coil 59, the time delay relay coil 60, and the actuating coil 61, which are parallelly connected in series therewith.

Deenergizing of the solenoid valve coil 59 and the actuating coil 61 results, respectively, in stopping operation at once of the supply bin shaker mechanism 19 and of the inclined conveyor 20 thereat; while the time delay relay coil 60 is set for a predetermined delay when deenergized that is sufficient to allow time enough for discharging to the operating station being serviced all empty quills remaining on the horizontal conveyor runs 21 and 22 when the inclined conveyor 20 and the supply bin shaker mechanism 19 are stopped. Following this delay, the contacts operated by the actuating coil 60 are allowed to close at 60' and to open at 60". Opening of the contacts 60" deenergizes actuating coil 63 which in turn opens the bridging circuit contacts 63', so as to deenergize any actuating coil 64, 65 or 66 that has previously been energized for setting any one of the corresponding conveyor means deflecting gates 27, 28 or 29, and thereby return the conveyor system to its original condition; while the closing of contacts 60' at the same time connects the interacting actuating coil 50 and normally closed contacts 51 for again operating the stepping relay 53 to start the system in operation again upon signaling of any further reserve quill supply depletion at any of the operating stations.

It should be noted particularly, in connection with the signalling of reserve quill supply depletion at any of the operations, that the stepping relay 53 always indexes in a given order with respect to the contacts thereof corresponding to the respective operating station hoppers A', B', C' and D', so that the depletion signaling may take place indiscriminately in any sequence, either at intervals or concurrently, and even simultaneously, without disturbing in any way the orderly operation of the system in responding to the signaling so as to select and effect servicing of the operating stations sequentially as long as reserve supply replenishment is required at any of the stations.

The present invention has been described in detail above for purposes of illustration only and is not intended to be limited by this description or otherwise except as defined in the appended claims.

I claim:

1. Apparatus of the character described for maintaining at each of a plurality of operating stations a reserve supply of articles being handled thereat, said apparatus comprising means for containing a common main supply of said articles, conveyor means running from said main supply means to all of said operating stations, means for operating said conveyor means to transfer articles from said main supply means selectively to any one of said operating stations, means at each of said operating stations for sensing, and anticipating exhaustion of, the reserve supply of articles thereat, and means responsive to said sensing means for controlling said conveyor operating means to select an operating station at which an anticipated exhaustion of the article reserve supply thereat has been sensed and to transfer a replenishing supply of articles thereto in a quantity sufficient to satisfy said sensing means.

2. Apparatus of the character described for maintaining at each of a plurality of operating stations a reserve supply of articles being handled thereat, said apparatus comprising means for containing a common main supply of said articles, conveyor means running from said main supply means to all of said operating stations, means for operating said conveyor means to deliver articles from said main supply to said operating stations, settable means for directing the delivery discharge from said conveyor means selectively to any one of said operating stations, means at each of said operating stations for sensing, and anticipating exhaustion of, the reserve supply of articles thereat, and means responsive to said sensing means for controlling said conveyor operating means and said settable directing means to select an operating station at which an anticipated exhaustion of the article supply thereat has been sensed and to deliver a replenishing supply of articles thereto in a quantity sufficient to satisfy said sensing means.

3. Apparatus of the character described for maintaining at each of a plurality of operating stations a reserve supply of articles being handled thereat, said apparatus comprising means for containing a common main supply of said articles, conveyor means running from said main supply means to all of said operating stations for transferring articles from said main supply means selectively to any one of said operating stations, separate means at each of said operating stations for sensing, and anticipating exhaustion of, the reserve supply of articles thereat, and means responsive to all of said separate sensing means for selecting an operating station at which an anticipated exhaustion of the article reserve supply thereat has been sensed and operating said conveyor means to transfer a replenishing supply of articles thereto in a quantity sufficient to satisfy said sensing means, said last mentioned means responding to said separate sensing means in a given order and acting to select successively in that order all operating stations at which an anticipated exhaustion of the article reserve supply has been concurrently sensed.

4. In combination with a plurality of quill winding machines each of which incorporates a hopper for containing a reserve supply of empty quills thereat, apparatus for maintaining a reserve quill supply in each of said hoppers comprising means for containing a common main supply of said quills, conveyor means running from said main supply means to all of said hoppers and settable for delivering quills from said main supply selectively to any one of said hoppers, sensing means at each of said hoppers for anticipating exhaustion of the reserve quill supply therein, and means selectively responsive to all of said sensing means for setting and operating said conveyor means to deliver a replenishing supply of quills to any hopper at which an anticipated exhaustion of the reserve quill supply has been sensed, each replenishing supply of quills being delivered in a quantity sufficient to satisfy the sensing means at the hopper replenished, and said selectively responsive means responding to said sensing means in a given order and acting to select successively in that order all hoppers at which an anticipated exhaustion of the reserve quill supply has been concurrently sensed.

5. Apparatus as defined in claim 4 and further characterized in that said sensing means comprises a mechanical feeler element arranged to gauge quantitatively the reserve quill supply in said hoppers, and an electric switch means controlled by said feeler element for closing upon depletion of said reserve quill supply to a predetermined extent.

6. Apparatus as defined in claim 4 and further characterized in that said means responsive to said sensing means comprises a stepping relay at which all of said sensing means are connected in said given order.

7. Apparatus for maintaining at each of a plurality of operating stations a reserve supply of articles being handled thereat, which apparatus comprises means for containing a common main supply of said articles, means for continuously sensing the reserve article supply at each of said operating stations, means for signalling any sensing by said last named means of depletion of a reserve article supply, and means for delivering a replenishing supply of articles selectively from said common main supply in response to said signalling and in a quantity sufficient to satisfy the sensing being signalled.

8. Apparatus for maintaining at each of a plurality of operating stations a reserve supply of articles being handled thereat, which apparatus comprises means for containing a common main supply of said articles for automatic replenishment of said reserve article supplies, means for continuously sensing the reserve article supply at each of said operating stations, means for signalling any sensing by said last named means of depletion of a reserve article supply, and means for automatically replenishing said reserve article supplies selectively from said main supply in a given order in response to said signalling and in a quantity sufficient to satisfy the sensing being signalled.

9. Apparatus for maintaining a reserve supply of empty quills in the hoppers of a plurality of quill winding machines, which apparatus comprises means for containing a common main supply of empty quills for automatic replenishing delivery to said hoppers, means for continuously sensing the reserve supply in each of said hoppers and signalling any sensed depletion of a reserve supply, and means for automatically replenishing each depleted reserve supply selectively from said main supply in a given order in response to said signalling and in a quantity sufficient to satisfy the sensing being signalled.

References Cited in the file of this patent
UNITED STATES PATENTS

| | | |
|---|---|---|
| 2,537,005 | Brown et al. | Jan. 9, 1951 |
| 2,828,873 | Arlin | Apr. 1, 1958 |